United States Patent [19]

Vax et al.

[11] 3,826,869

[45] July 30, 1974

[54] CLOCK SYNCHRONIZATION CIRCUIT

[75] Inventors: Naftali Vax; Wook Rang Shim, both of San Francisco, Calif.

[73] Assignee: Lynch Communication Systems, Inc., San Francisco, Calif.

[22] Filed: Sept. 18, 1972

[21] Appl. No.: 290,226

[52] U.S. Cl. .......... 178/69.5 R

[51] Int. Cl. .......... H04l 7/00

[58] Field of Search .......... 178/69.5 R, 53, 53.1 R, 178/70; 179/15 BS, 15 BA; 325/13; 328/155

[56] References Cited

UNITED STATES PATENTS

| | | | |
|---|---|---|---|
| 3,671,865 | 6/1972 | Szumila | 179/15 BS |
| 3,702,379 | 11/1972 | Peterson | 179/15 BS |
| 3,723,714 | 3/1973 | Jackson | 179/15 BS |
| 3,729,586 | 4/1973 | Chow | 178/69.5 R |

*Primary Examiner*—Richard Murray

*Attorney, Agent, or Firm*—Phillips, Moore, Weissenberger, Lempio & Strabala

[57] ABSTRACT

The receiver clock of an asynchronous half-duplex data link in a call concentrator is initiated and synchronized by a synchronization circuit which responds to level transitions in a received pulse train and overrides the internal operation of the receiver clock to pull it into synchronism with the transmitter clock each time a level transitions in the receiver clock is out of phase with the corresponding level transitions of the transmitter clock as embodied in the pulse train. The two clocks of the data link are identical and can function either as master or as slave, depending on the direction of transmission.

9 Claims, 5 Drawing Figures

CLOCK SYNCHRONIZATION CIRCUIT

REFERENCE TO RELATED APPLICATIONS

The circuit of this invention is intended specifically for use in the control system of copending application Ser. No. 264,513, filed June 20, 1972, and entitled "CALL CONCENTRATOR CONTROL SYSTEM," although it has other uses as well.

BACKGROUND OF THE INVENTION

The aforementioned copending application discloses a control system for a call concentrator in which control data is transferred from a central office control unit to a remote control unit over a half-duplex, asynchronous data link in the form of messages encoded upon a 24-bit train of square-wave positive pulses preceded by a continuous start pulse consisting, in essence, of ten consecutive "ones".

The first bit of the pulse train is always "0", so that a time reference is provided for the start of the pulse train by the falling edge (i.e., the end) of the start pulse. Thereafter, provisions are made in the pulse train and in the message code to provide a level transition (rising from the 0 level to the 1 level or falling from the 1 level to the 0 level) about every fifth bit, on the average, throughout the pulse train. The clock thereupon counts 24 cycles or data bits and, on the receiving side, triggers a sampling circuit at the center of each bit.

Inasmuch as it is physically impossible to achieve and maintain absolutely perfect identity between the receiving clock cycle and the transmitting clock cycle (particularly under the environmental conditions in which call concentrators operate), and uneconomical to even come close to that goal, the pulse sample tended to wander seriously off center as the pulse train progressed. Thus, it became necessary to provide a simple synchronization circuit for the receiver clock which could "track" the transmitter clock and resynchronize itself with it at each level transition in the pulse train.

SUMMARY OF THE INVENTION

The invention solves the above-described problem by providing, in addition to the pair of ring-connected monostable multivibrators which form the clock itself, an additional monostable multivibrator capable of inhibiting the triggering of the second clock mono by the first. If the clock runs too fast, a transition-indicating spike produced by the circuit at each level transition in the pulse train is allowed to trigger the additional mono, which then prevents triggering of the second clock mono until a proper time interval has elapsed since the occurrence of the level transition.

The transition indicating spike also triggers a flip-flop connected to the triggering circuit of the first mono. In normal operation, actuation of the flip-flop has no effect on the clock. If the clock runs too slow, however, the flip-flop output is substituted for the output of the second mono, so as to trigger the first mono at the occurrence of the level transition in the pulse train.

Due to the half-duplex operation of the system, in which each clock is alternately the master and the slave, means are provided to alternately operate the clock for a predetermined number of cycles in a free-running mode in response to an enabling signal, and for the same number of cycles in a transition-synchronized mode in response to the start pulse contained in a received pulse train.

The transition synchronization of the clock in the slave mode prevents the clock from ever getting badly out of phase with the received pulse train, and therefore permits the use of inexpensive clock components and dispenses with the need for close environmental control. The latter advantage is particularly useful in call concentrators of the type described in the above-identified copending application, as the remote unit of these concentrators is often installed out-of-doors and is therefore exposed to large temperature variations.

It is the object of the invention to provide a clock which can track a received pulse train accurately with low-quality clock components.

It is another object of the invention to provide a clock which is synchronized by any level transition in the clocked pulse train.

It is a further object of the invention to provide a clock alternating between a free-running transmit mode and a transition-synchronized receive mode, each of predetermined length, and featuring highly simplified circuitry, requiring no high-quality components.

DESCRIPTION OF THE PREFERRED EMBODIMENT

Figure 1:
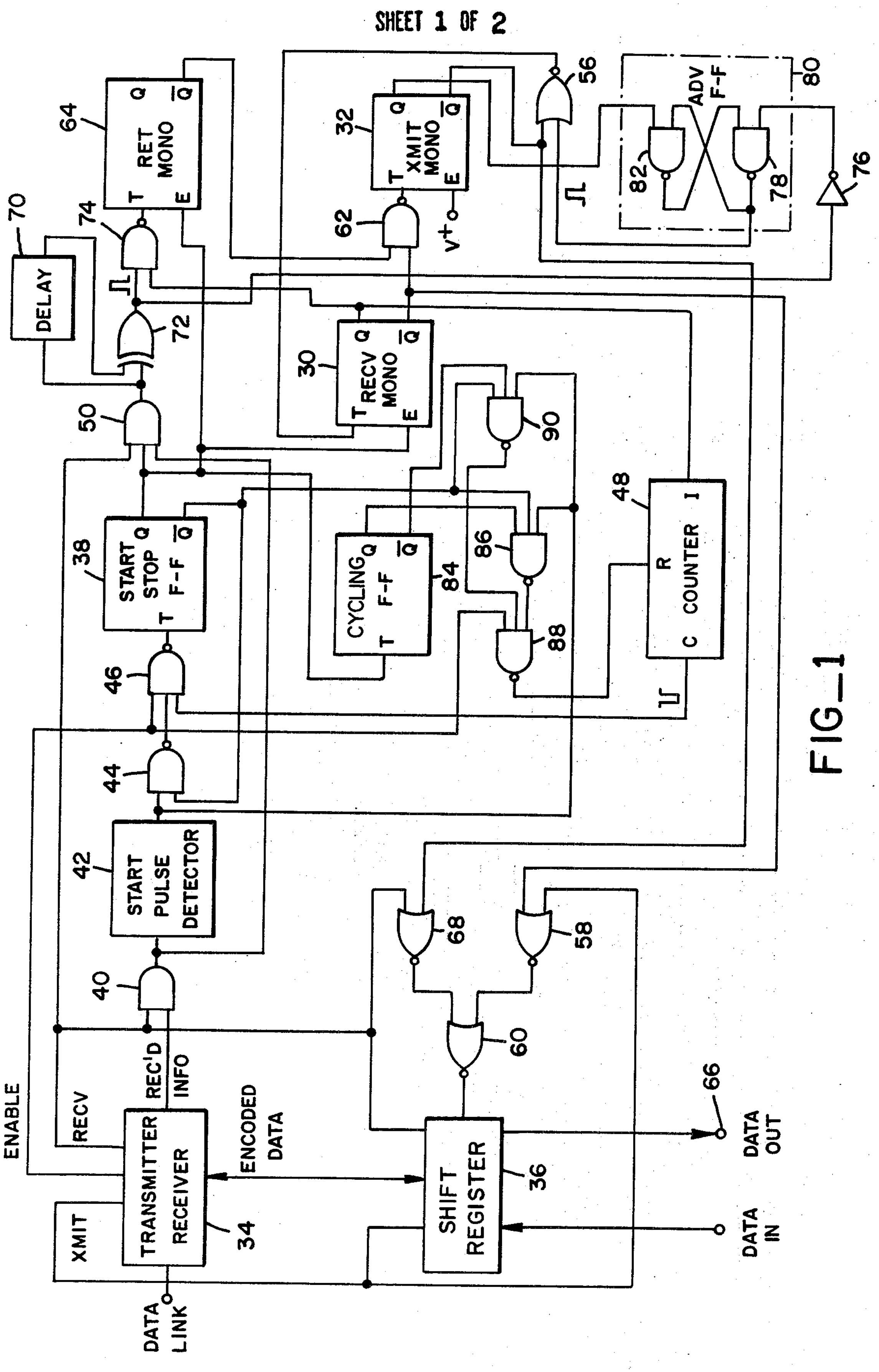
FIG. 1 is a logic diagram illustrating the circuit of the invention.

In the logic diagram of FIG. 1, the clock consists of a pair of monostable multivibrators (hereinafter referred to as "monos") 30, 32. The output of receive mono 30 is connected to the input of transmit mono 32, and the output of transmit mono 32 is connected to the input of receive mono 30. The unstable period of each of monos 30, 32 is one-half cycle, i.e., one half the width of the data pulses 1 through 24 of FIG. 2. Thus, the falling edge of the output of transmit mono 32 initiates the data pulse in the transmit mode of the apparatus, while the falling edge of the output of receive mono 30 causes the received pulse train to be momentarily sampled when the apparatus is in the receive mode.

Figure 2:
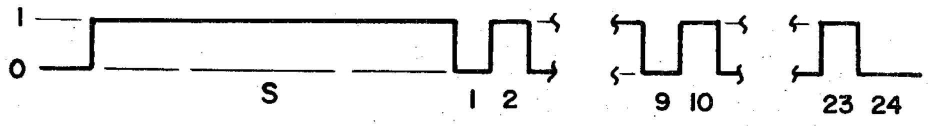
FIG. 2 is a time-amplitude diagram showing the pulse train used in connection with the circuit of FIG. 1.

The present invention is concerned only with the clocking of the pulse train of FIG. 2; not with its encoding or decoding, nor with its transmission or reception. It is therefore assumed that the transmitter-receiver 34 of FIG. 1 contains appropriate circuits for producing a sharp, noise-free pulse train from a received signal, and that the shift register 36 of FIG. 1 is suitably connected to encode and decode pulse trains when supplied with the proper timing signals by the clock circuitry of this invention.

Figure 3A:
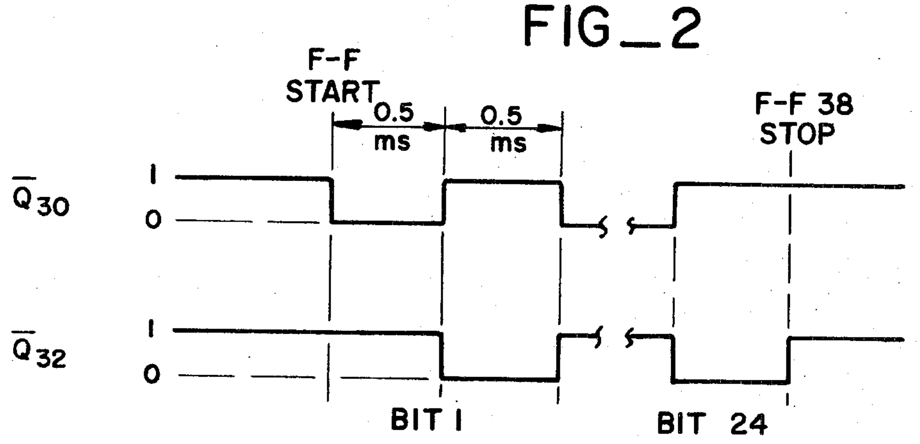
FIGS. 3*a* through 3*c* are time-amplitude diagrams illustrating the functioning of the circuit.
Figure 3B:
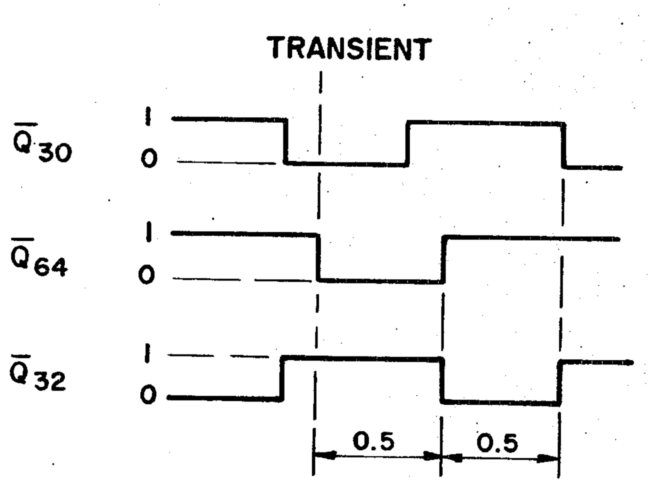
Figure 3C:
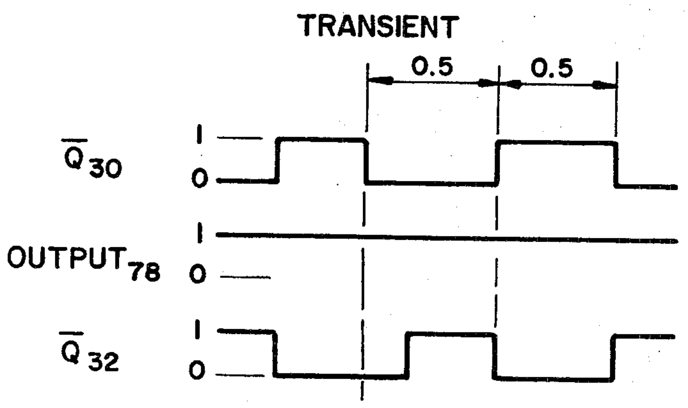

FIG. 3 shows the logic values of various points in the circuit during its operation. The upper curve of FIG. 3a represents the $\overline{Q}$ output of receive mono 30, while the lower curve of FIG. 3a represents the $\overline{Q}$ output of transmit mono 32. The idle or stable state of both is logic 1. When the mono is enabled by the application of a 1 to enabling terminal E, a falling edge (i.e. transition from 1 to 0) at trigger terminal T triggers the mono into its unstable state in which $\overline{Q}$ goes to O. The output Q, of course, is always the inverse of $\overline{Q}$.

Transmit mono 32 is always enabled. Receive mono 30, on the other hand, is enabled by start-stop flip-flop 38 only during the transmission or receipt of a pulse train.

With these conventions in mind, the receipt of a pulse train operates the clock circuit in the following manner:

The received pulse train is conveyed from transmitter-receiver 34 to the lower input of AND gate 40. When the transmitter receiver 34 is in the receive mode, the upper input of AND gate 40 is held at 1, so that the received pulse train passes directly into start pulse detector 42. The latter is essentially a delayed-response device and may consist simply of a capacitance-bridged pair of series-connected inverters. Assuming the start pulse S (FIG. 2) to be 10 ms long, the start pulse detector will produce a 1 at its output after its input has remained at 1 for, say, 4 ms.

The output of start pulse detector is the upper input of NAND gate 44, whose lower input is at 1 in the idle condition of start-stop flip-flop 38. Consequently, the start pulse is inverted and becomes a 0 at the center input of NAND gate 46. Whenever the circuit is ready to receive or transmit a pulse train, the gate 46 is enabled by the transmitter-receiver 34 at its upper input and by the empty condition of the counter 48 at its lower input.

The appearance of a 0 at the center input of NAND gate 46 changes the trigger input T of start-stop flip-flop 38 from its idle 0 condition to a 1. Inasmuch as flip-flop 38 is triggered only by a falling edge, nothing happens. However, when the start pulse ceases, the trigger input T of flip-flop 38 goes back to 0, and flip-flop 38 changes state. The resulting 0 at its $\overline{Q}$ output inhibits NAND gate 44 and makes flip-flop 38 unresponsive to any further level transitions in the pulse train.

The 1 at the Q output of flip-flop 38 is transmitted to the center input of AND gate 50, where it enables gate 50 to pass the received pulse train from AND gate 40 when the transmitter-receiver 34 is in the receive mode and a 1 consequently appears at the upper input of AND gate 50. At the same time, the 1 at the Q output of flip-flop 38 enables receive mono 30 by applying a 1 to its enable terminal E.

With the output of NOR gate 56 at "0" when transmit mono 32 is idle ($\overline{Q} = 1$), receive mono 30 starts running as soon as it is enabled. Its $\overline{Q}$ output goes to 0, changing the output of NOR gate 58 to "1" and the output of NOR gate 60 to 0. At the same time, the lower input of NAND gate 62 goes to 0, and inasmuch as the upper input of NAND gate 62 is at 1 due to the idle condition of synchronizing or retard mono 64, the output of NAND gate 62 goes from 0 to 1, a change which has no effect on transmit mono 32.

At the end of the unstable period of receive mono 30, (e.g., 0.5 ms), mono 30 returns to its idle or stable condition. The output of NOR gate 58 returns to 0, and the output of NOR gate 60 returns to 1. The resultant rising edge causes the received pulse train to be sampled and the sampled data to be conveyed to data-out terminal 66. Simultaneously, the output of NAND gate 62 returns to 0, and transmit mono 32 is triggered.

With the lower input of NOR gate 56 normally 0, the resultant change of the $\overline{Q}$ output of mono 32 from 1 to 0 causes the output of NOR gate 56 to go from 0 to 1, which has no effect on receive mono 30. Likewise, the output of NOR gate 68 is held at 0 by the 1 at the receive mode output of transmitter-receiver 34, so that transmit mono 32 has no effect on multiplexer 36 in this mode.

At the end of the unstable period of transmit mono 32 (e.g., 0.5 ms for a total cycle length of 1 ms), the $\overline{Q}$ output of transmit mono 32 returns to 1, thus changing the output of NOR gate 56 from 1 to 0 and triggering receive mono 30. The above-described cycle now repeats itself.

Inasmuch as the timing of the clock, when left to its own devices, depends solely upon the length of the unstable periods of monos 30 and 32, the clock would rapidly pull out of synchronism with the pulse train unless it is periodically resynchronized. For this purpose, the pulse train is now applied through a short delay circuit 70 (again, most simply, a pair of inverters bridged by a capacitance) to the upper input, and directly to the lower input, of an EXCLUSIVE-OR gate 72, which produces a momentary 1 spike whenever a level transition (rising or falling) occurs in the pulse train.

The level transition in the pulse train must always be coincident with the triggering of receive mono 30. If receive mono 30 has been triggered early (FIG. 3*b*), the resulting too-early triggering of transmit mono 32 when mono 30 returns to its stable condition is prevented by retard mono 64. Normally, in the absence of a level transition, the upper input of NAND gate 74 is at 0. Hence, the output of NAND gate 74 is 1, and mono 64 is prevented from being triggered when it is first enabled by flip-flop 38. The triggering of receive mono 30 in advance of a level transition causes the lower input of NAND gate 74 to be 1 when the transition occurs. Consequently, the transition-indicating spike produced by EXCLUSIVE-OR gate 72 causes a momentary 0 at the trigger terminal T of mono 64 and thus triggers the retard mono 64.

During the unstable period of retard mono 64 (nominally identical to that of receive mono 30), the 0 condition of its $\overline{Q}$ output inhibits NAND gate 62, so that the return of receive mono 30 to its stable condition cannot trigger transmit mono 32 until retard mono 64 has also returned to its stable condition. The sampling of the pulse train by multiplexer 36, which occurs at the return of receive mono 30 to its stable postion, will still be slightly off in time, but it will be accurate again when the clock is back in synchronism on the next cycle.

When the receive mono 30 is triggered late, retard mono 64 cannot function because NAND gate 74 is still inhibited when the transition-indicating spike occurs. However, in this case, the transition-indicating spike put out by EXCLUSIVE-OR gate 72 is inverted by inverter 76 and applied to the lower input of NAND gate 78 of advance flip-flop 80. Inasmuch as the Q output of transmit mono 32 is 0 whenever mono 32 is idle, the output of NAND gate 82 is normally 1. In the absence of a level transition, the lower input of NAND gate 78 is also 1. Consequently, the normal output of NAND gate 78 is 0, and the occurrence of transition-indicating spike momentarily brings it to 1.

If the clock is late (FIG. 3*c*), the $\overline{Q}$ output of transmit mono 32 is 0 when the spike occurs, and the output of NOR gate 56 just prior to the occurrence of the spike is 1. The occurrence of the spike momentarily changes the output of NOR gate 56 to 0 and thus triggers receive mono 30 in proper synchronism with the transition.

Advance flip-flop 80 has no effect when the clock is early, as the spike then occurs at a time when the output of NOR gate 56 is already 0, so that the spike does not change it.

Each triggering of receive mono 30 causes a 1 to be applied to the input terminal I of a counter 48. After 24 counts (for the 24 data bits in the pulse train of FIG. 2), the counter 48 puts out a momentary 0 spike at its control output C. This spike momentarily brings the output of NAND gate 46 to 1 and then immediately back to 0. The return of 0 triggers that start-stop flip-flop 38 and switches it off, thus removing the enabling 1 to receive mono 30 and retard mono 64, and stopping the clock.

The counter 48 is cleared prior to each transmitting or receiving operation by applying a 1 to its reset terminal R. This resetting 1 is produced by bringing any one of the three inputs of NAND gate 86 to 0.

The three inputs of gate 86 correspond to the three possible operations which can be performed by the apparatus as described in copending application Ser. No. 264,513 filed June 20, 1972 entitled "CALL CONCENTRATOR CONTROL SYSTEM": (1) transmission (of either original data or a confirmation); (2) reception of a confirmation of previously transmitted data; (3) reception of original data. Depending on whether the apparatus is originating a switching command or receiving a switching command, its operational cycle is either (1) followed by (2), or (3) followed by (1). In either event, a complete operational cycle consists of two successive operations, following which the apparatus goes into a stand-by or inactive mode until the next switching command occurs.

At the beginning of each operational cycle, cycling flip-flop 84 is in the condition where its Q output is 0. At the end of the first operation of the cycle, the return to 0 of the Q output of start-stop flip-flop 38 triggers cycling flip-flop 84 to produce a 1 at its Q output. Likewise, at the end of the second operation of the cycle, the Q output of cycling flip-flop 84 returns to 0.

The "enable" line shown coming from transmitter-receiver 34 is controlled by appropriate control circuitry (not shown) in the signaling circuits associated with transmitter-receiver 34 so as to be 1 at all times except while the transmitter-receiver 34 is transmitting a start pulse immediately preceding the transmission of a data pulse train.

It will now be seen that the counter 48 is reset as follows: Just prior to operation 1) (transmission), counter 48 is reset when the "enable" line goes to 0 while a start pulse is being transmitted. Just prior to operation 2), $\overline{Q}$ of 38 is 1, and Q of 84 is 1. When a start pulse is detected by detector 42, all three inputs to NAND gate 86 are 1, and the bottom input to NAND gate 88 becomes 0, resetting counter 48. Just prior to operation 3), $\overline{Q}$ of 38 is 1, and $\overline{Q}$ of 84 is 1. When a start pulse is now detected by detector 42, all three inputs to NAND gate 90 are 1, and the center input of NAND gate 88 becomes 0, resetting counter 48.

At the beginning of a transmission, the cessation of the enable signal applied to the upper input of NAND gate 46 during the transmission of the start pulse brings the output of NAND gate 46 momentarily to 1 and back down to 0, triggering start-stop flip-flop 38 as the enable signal reappears. With the transmitter-receiver 34 in the transmit mode, the clock now operates on its own and triggers the shift register 34 through NOR gate 68 at the beginning of each pulse rather than at its center, as is the case in the receive mode.

Prior to a receive operation, however, the enable signal is steady at 1, and start-stop flip-flop 38 cannot start until the start pulse detector 42 has detected a start pulse as previously described.

As noted in the copending application referred to herein, bits 9 and 10 of the pulse train of FIG. 2 are resynchronizing bits and are always 0–1 to provide at least one resynchronizing transition. In addition, the message code of the pulse train of FIG. 2 is preferably so designed as to provide, in any valid message, a level transition about every fifth bit, on the average.

What is claimed is:

1. A clock circuit for a half-duplex, asynchronous data link, comprising:

a. transceiver means for transmitting and receiving over said data link pulse trains containing encoded data in the form of the presence or absence of essentially square-wave pulses, each said pulse train beginning with an identifiable start pulse which ends in a falling edge;
b. means for producing a steady enabling signal whenever said transciever is not transmitting a start pulse;
c. a pair of ring-connected monostable multivibrators connected to trigger each other;
d. flip-flop means for enabling one of said monostable multivibrators;
e. means for triggering said flip-flop means alternately in response to said steady enabling signal and in response to the falling edge of the start pulse of a pulse train received over said data link; and
f. counter means for restoring said flip-flop means at the end of a predetermined number of cycles of said monostable multivibrators.

2. The circuit of claim 1, further comprising:

g. a third monostable multivibrator;
h. a second flip-flop means; and
i. transition-responsive means for generating a transition-indicating spike whenever a level transition appears in said received pulse train; said third monostable multivibrator, second flip-flop, and transition-responsive means being so interconnected with said pair of monostable multivibrators that application of said spike to said third multivibrator prevents one of said pair of multivibrators from being triggered for a predetermined length of time, and that application of said spike to said second flip-flop causes the other of said pair of multivibrators to be triggered if it is not already triggered.

3. The method of synchronizing a pair of monostable multivibrators with a pulse train, comprising the steps of:

a. detecting level transitions in said pulse train;
b. causing said multivibrators to produce internal triggering signals for one another independently of said pulse train;
c. deriving from said detected level transitions external triggering signals having a predetermined phase relationship to said level transitions; and
d. using one of said external triggering signals for the corresponding internal triggering signal produced by one of said multivibrators to trigger the other multivibrator whenever the latter triggering signal is noncoincident with said level transition.

4. Apparatus for receiving and transmitting coded pulse trains, comprising:

a. transmitter-receiver means;

b. shift register means arranged to encode transmitted pulse trains and to decode received pulse trains;

c. clock means including a pair of monostable multivibrators connected to trigger one another for timing the operation of said shift register means;

d. clock control means for operating said clock means in discrete sequences of n cycles each, n being the number of bits in the pulse train; and e. synchronizing means operative when said apparatus is in the receive mode to synchronize said clock means with level transitions in the received pulse train, said synchronizing means including:

i. spike-producing means connected to said transmitter-receiver means to produce a spike whenever a level transition occurs in a received pulse train;

ii. retarding monostable multivibrator means connected to be triggered by said spike and to inhibit operation of said clock means when said retarding mono is in its unstable condition; and iii. advance flip-flop means connected to said clock means and said spike-producing means so as to trigger said clock means upon the occurrence of a spike prior to the internal triggering of the clock.

5. Apparatus according to claim 4, in which said retarding mono means inhibit triggering of the second clock mono by the first, and said advance flip-flop means trigger said first clock mono if said second clock mono is in its unstable condition when said spike occurs.

6. The apparatus of claim 5, further comprising logic gate means connected to said clock monos, said transmitter-receiver means, and said shift register means to provide a triggering signal to said shift register means coincident with the triggering of said first clock mono when said transmitter-receiver is in the receive mode, and coincident with the triggering of said second clock mono when said transmitter-receiver is in the transmit mode.

7. The apparatus of claim 4, in which said clock control means include a start-stop flip-flop connected to receive a count at each cycle of said clock means and arranged to produce an output spike when full; said start-stop flip-flop being connected to be start-triggered by the trailing edge of the start pulse of a received pulse train in the receive mode of said transmitter-receiver means, and by an enabling signal in the transmit mode of said transmitter-receiver means, and to be stop-triggered by said counter output spike.

8. The apparatus of claim 7, further comprising reset means to clear said counter, said reset means including alternatively operable means to produce a resetting pulse upon either the transmission or reception of a start pulse preceding a data pulse train.

9. The apparatus of claim 8, further comprising received start pulse detection means, and in which said reset means include a plurality of logic gate means connected to the enabling signal source of said transmitter-receiver means, said start pulse detection means, and said start-stop flip-flop to clear said counter whenever said start-stop flip-flop is in the stopped condition while either said enabling signal is absent, or a received start pulse is being detected by said start pulse detection means.

* * * * *